US007594052B2

(12) United States Patent  
Radulescu et al.

(10) Patent No.: US 7,594,052 B2  
(45) Date of Patent: Sep. 22, 2009

(54) INTEGRATED CIRCUIT AND METHOD OF COMMUNICATION SERVICE MAPPING

(75) Inventors: Andrei Radulescu, Eindhoven (NL); Kees Gerard Willem Goossens, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 301 days.

(21) Appl. No.: 10/598,795

(22) PCT Filed: Mar. 7, 2005

(86) PCT No.: PCT/IB2005/050833

§ 371 (c)(1),
(2), (4) Date: Sep. 12, 2006

(87) PCT Pub. No.: WO2005/091574

PCT Pub. Date: Sep. 29, 2005

(65) Prior Publication Data

US 2007/0186018 A1  Aug. 9, 2007

(30) Foreign Application Priority Data

Mar. 17, 2004 (EP) .................................. 04101095

(51) Int. Cl.
*G06F 13/42* (2006.01)
*G06F 13/14* (2006.01)

(52) U.S. Cl. ...................................... 710/105; 710/305

(58) Field of Classification Search .............. 710/105, 710/305, 316; 709/201–202, 226–230, 232, 709/238, 243–244, 250; 712/10, 11, 28, 712/29–30

See application file for complete search history.

(56) References Cited

U.S. PATENT DOCUMENTS

2005/0202835 A1* 9/2005 Sato et al. ................. 455/456.6
2005/0203988 A1* 9/2005 Nollet et al. ................. 709/201

FOREIGN PATENT DOCUMENTS

WO WO 2004034590 A2 * 4/2004

OTHER PUBLICATIONS

Dielissen, John, et al. "Concepts and Implementation of the Philips Network-on-Chip". IP-Based SOC Design. Nov. 2003. pp. 1-6.*

(Continued)

*Primary Examiner*—Thomas J Cleary

(57) ABSTRACT

An integrated circuit, comprising a plurality of processing modules (M, S) is provided, wherein at least one first of said processing modules (M) requests at least one communication service to at least one second processing module (S) based on specific communication properties and at least one communication service identification. Furthermore, an interconnect means (N) is provided for coupling said plurality of processing modules (M, S) and for enabling a connection based communication having a set of connection properties. At least one network interface (NI) is associated to said at least one first of said processing modules (M) for controlling the communication between said at least one first of said plurality of processing modules (M) and said interconnect means (N). Moreover, a mapping means (A) is provided for mapping the requested at least one communication service based on said specific communication properties to a connection based on a set of connection properties according to said at least one communication service identification.

7 Claims, 3 Drawing Sheets

OTHER PUBLICATIONS

Radulescu, Andrei, et al. "Communication Services for Networks on Chip". 2000. Marcel Dekker, Inc. pp. 275-299.*

Radulescu, Andrei, et al. "An Efficient On-Chip NI Offering Guaranteed Services, Shared-Memory Abstraction, and Flexible Network Configuration". IEEE Transactions of Computer-Aided Design of Integrated Circuits and Systems. vol. 24, No. 1. Jan. 2005. pp. 4-17. 0278-0070.*

Rijpkema, E., et al. "Trade Offs in the Design of a Router with Both Guaranteed and Best-Effort Services for Networks on Chip". Proceedings of Design, Automation and Test Conference in Europe (DATE). Mar. 2003. pp. 1-6.*

Vermeulen, Bart, et al. "Bringing Communication Networks on a Chip: Test and Verification Implications". IEEE Communications Magazine. Sep. 2003. pp. 74-81. 0163-6804/03.*

Ciordas, Calin, et al. "An Event-Based Network-on-Chip Monitoring Service". International High Level Design Validation iand Test Workshop (HLDVT). Nov. 2004. pp. 1-6.*

"Kees Goossens's Publications Page". pp. 1-28. Retrieved from Internet Sep. 19, 2008. <http://homepages.inf.ed.ac.uk/kgoossen/research.html>.*

Goossens, Kees. "Networks on Chip". Nov. 14, 2006. NXP Semiconductors. pp. 1-123.*

* cited by examiner

INTEGRATED CIRCUIT AND METHOD OF COMMUNICATION SERVICE MAPPING

FIELD OF THE INVENTION

The invention relates to an integrated circuit having a plurality of processing modules and an interconnect means for coupling said plurality of processing modules and a method for communication service mapping in such an integrated circuit.

BACKGROUND OF THE INVENTION

Systems on silicon show a continuous increase in complexity due to the ever increasing need for implementing new features and improvements of existing functions. This is enabled by the increasing density with which components can be integrated on an integrated circuit. At the same time the clock speed at which circuits are operated tends to increase too. The higher clock speed in combination with the increased density of components has reduced the area which can operate synchronously within the same clock domain. This has created the need for a modular approach. According to such an approach the processing system comprises a plurality of relatively independent, complex modules. In conventional processing systems the systems modules usually communicate to each other via a bus. As the number of modules increases however, this way of communication is no longer practical for the following reasons. On the one hand the large number of modules forms a too high bus load. On the other hand the bus forms a communication bottleneck as it enables only one device to send data to the bus.

A communication network forms an effective way to overcome these disadvantages. Networks on chip (NoC) have received considerable attention recently as a solution to the interconnect problem in highly-complex chips. The reason is twofold. First, NoCs help resolve the electrical problems in new deep-submicron technologies, as they structure and manage global wires. At the same time they share wires, lowering their number and increasing their utilization. NoCs can also be energy efficient and reliable and are scalable compared to buses. Second, NoCs also decouple computation from communication, which is essential in managing the design of billion-transistor chips. NoCs achieve this decoupling because they are traditionally designed using protocol stacks, which provide well-defined interfaces separating communication service usage from service implementation.

Using networks for on-chip communication when designing systems on chip (SoC), however, raises a number of new issues that must be taken into account. This is because, in contrast to existing on-chip interconnects (e.g., buses, switches, or point-to-point wires), where the communicating modules are directly connected, in a NoC the modules communicate remotely via network nodes. As a result, interconnect arbitration changes from centralized to distributed, and issues like out-of order transactions, higher latencies, and end-to-end flow control must be handled either by the intellectual property block (IP) or by the network.

Most of these topics have been already the subject of research in the field of local and wide area networks (computer networks) and as an interconnect for parallel machine interconnect networks. Both are related to on-chip networks, and many of the results in those fields are also applicable on chip. However, NoC's premises are different from off-chip networks, and, therefore, most of the network design choices must be reevaluated. On-chip networks have different properties (e.g., tighter link synchronization) and constraints (e.g., higher memory cost) leading to different design choices, which ultimately affect the network services.

NoCs differ from off-chip networks mainly in their constraints and synchronization. Typically, resource constraints are tighter on chip than off chip. Storage (i.e., memory) and computation resources are relatively more expensive, whereas the number of point-to-point links is larger on chip than off chip. Storage is expensive, because general-purpose on-chip memory, such as RAMs, occupy a large area. Having the memory distributed in the network components in relatively small sizes is even worse, as the overhead area in the memory then becomes dominant.

For on-chip networks computation too comes at a relatively high cost compared to off-chip networks. An off-chip network interface usually contains a dedicated processor to implement the protocol stack up to network layer or even higher, to relieve the host processor from the communication processing. Including a dedicated processor in a network interface is not feasible on chip, as the size of the network interface will become comparable to or larger than the IP to be connected to the network. Moreover, running the protocol stack on the IP itself may also be not feasible, because often these IPs have one dedicated function only, and do not have the capabilities to run a network protocol stack.

The number of wires and pins to connect network components is an order of magnitude larger on chip than off chip. If they are not used massively for other purposes than NoC communication, they allow wide point-to-point interconnects (e.g., 300-bit links). This is not possible off-chip, where links are relatively narrower: 8-16 bits.

Introducing networks as on-chip interconnects radically changes the communication when compared to direct interconnects, such as buses or switches. This is because of the multi-hop nature of a network, where communication modules are not directly connected, but separated by one or more network nodes. This is in contrast with the prevalent existing interconnects (i.e., buses) where modules are directly connected. The implications of this change reside in the arbitration (which must change from centralized to distributed), and in the communication properties (e.g., ordering, or flow control).

Network on chip are a platform-based design with an aim to reduce the cost of system design through re-use of applications and architectures. A platform decouples applications and system architectures, by defining a template architecture and programming model, i.e. by limiting the freedom in which an application can be implemented on an architecture, the interdependence of application and architecture is concentrated and reduced. However, the convergence of applications involve an increasing diversity and dynamics in resource usage (such as communication and computation patterns), and an increasing need for differentiated services.

Accordingly, the communication infrastructure is a critical component of a platform, because it must implement diverse application behaviors with application-dependent IPs in an application-independent manner. However, using a NOC for the platform interconnect helps solving both problems by integrating heterogeneous IPs in a standard fashion. In other words, the NOC services largely define the platform, and it naturally provides differentiated services by means of a (partially application-dependent) protocol stack.

Moreover, it is desirable to combine and control many local, perhaps autonomous, components in an efficient and flexible manner. However, as the IP blocks or modules, which are to be connected operate by modern on-chip communication protocols (e.g., Device Transaction Level DTL, Open Core Protocol OCP, and AXI-Protocol), they must be incorporated to the network on chip.

It is therefore an object of the invention to improve the integration of standard processing modules into a network on chip.

This object is achieved by an integrated circuit according to claim 1, a method for communication service mapping in such an integrated circuit according to claim 6, and a data processing system according to claim 7.

Therefore, an integrated circuit, comprising a plurality of processing modules is provided, wherein at least one first of said processing module requests at least one communication service to at least one second processing module based on specific communication properties and at least one communication service identification. Furthermore, an interconnect means is provided for coupling said plurality of processing modules and for enabling a connection based communication having a set of connection properties. At least one network interface is associated to said at least one first of said processing modules for controlling the communication between said at least one first of said plurality of processing modules and said interconnect means. Moreover, said at least one network interface comprises a mapping means for mapping the requested at least one communication service based on said specific communication properties to a connection based on a set of connection properties according to said at least one communication service identification.

Accordingly, a seamless integration of the processing modules into a network on chip is achieved.

According to an aspect of the invention said mapping means is arranged in said at least one network interface, such that the processing modules can continue with their dedicated operations without having to deal with the mapping of services.

According to an aspect of the invention said communication service identification comprises at least one communication thread, wherein said at least one communication thread is mapped to at least one connection based on a set of connection properties.

According to a further aspect of the invention said communication service identification comprises at least one address range in said at least one second processing module, wherein said at least one address range is mapped to at least one connection based on a set of connection properties.

The invention is also related to a method for communication mapping of processing in an integrated circuit, having a plurality of processing modules, wherein at least one first of said processing modules requests at least one communication service to at least one second processing module based on specific communication properties and at least one communication service identification. Said plurality of processing modules are coupled by an interconnect means and enabling a connection based communication having a set of connection properties. The communication between said at least one first of said plurality of processing modules and said interconnect means is controlled by at least one network interface associated to said at least one first of said processing modules. The requested at least one communication service based on said specific communication properties is mapped to a connection based on a set of connection properties according to said at least one communication service identification.

The invention is also related to a data processing system comprising a plurality of processing modules is provided, wherein at least one first of said processing module requests at least one communication service to at least one second processing module based on specific communication properties and at least one communication service identification. Furthermore, an interconnect means is provided for coupling said plurality of processing modules and for enabling a connection based communication having a set of connection properties. At least one network interface is associated to said at least one first of said processing modules for controlling the communication between said at least one first of said plurality of processing modules and said interconnect means. Moreover, said at least one network interface comprises a mapping means for mapping the requested at least one communication service based on said specific communication properties to a connection based on a set of connection properties according to said at least one communication service identification.

Therefore, the mapping may also be implemented in a system with several different integrated circuits.

The invention is based on the idea to offer differentiated services for protocols such as DTL, MTL, AXI, and OCP, by mapping the identification means of these protocols to connections. The identification means in the existing protocols are: communication threads and addresses, i.e. the threads or addresses are mapped to connections through the interconnect based on specific connection properties.

Further aspects of the invention are described in the dependent claims.

These and other aspects of the invention are apparent from and will be elucidated with reference to the embodiment(s) described hereinafter.

DESCRIPTION OF THE PREFERRED EMBODIMENTS

The following embodiments relate to systems on chip, i.e. a plurality of modules on the same chip (including e.g. system in a package, multi-die modules) or on different chips, communicate with each other via some kind of interconnect. The interconnect is embodied as a network on chip NOC, allowing communication between all aforementioned modules. The network on chip may include wires, bus, time-division multiplexing, switches, and/or routers within a network. At the transport layer of said network, the communication between the modules may be performed over connections. A connection is considered as a set of channels, each having a set of connection properties, between a first module and at least one second module. For a connection between a first module and a single second module, the connection comprises at least one channel, namely one from the first module to the second channel, i.e. the request channel, and an optional second from the second to the first module, i.e. the response channel. The request channel is reserved for data and messages from the first to the second, while the response channel is reserved for data and messages from the second to the first module. However, if the connection involves one first and N second modules, 2*N channels can be provided. The connection properties may include ordering (data transport in order), flow control (a remote buffer is reserved for a connection, and a data producer will be allowed to send data only when it is guaranteed that space is available for the produced data), throughput (a lower bound on throughput is guaranteed), latency (upper bound for latency is guaranteed), the lossiness (dropping of data), transmission termination, transaction completion, data correctness, priority, or data delivery.

Figure 1:
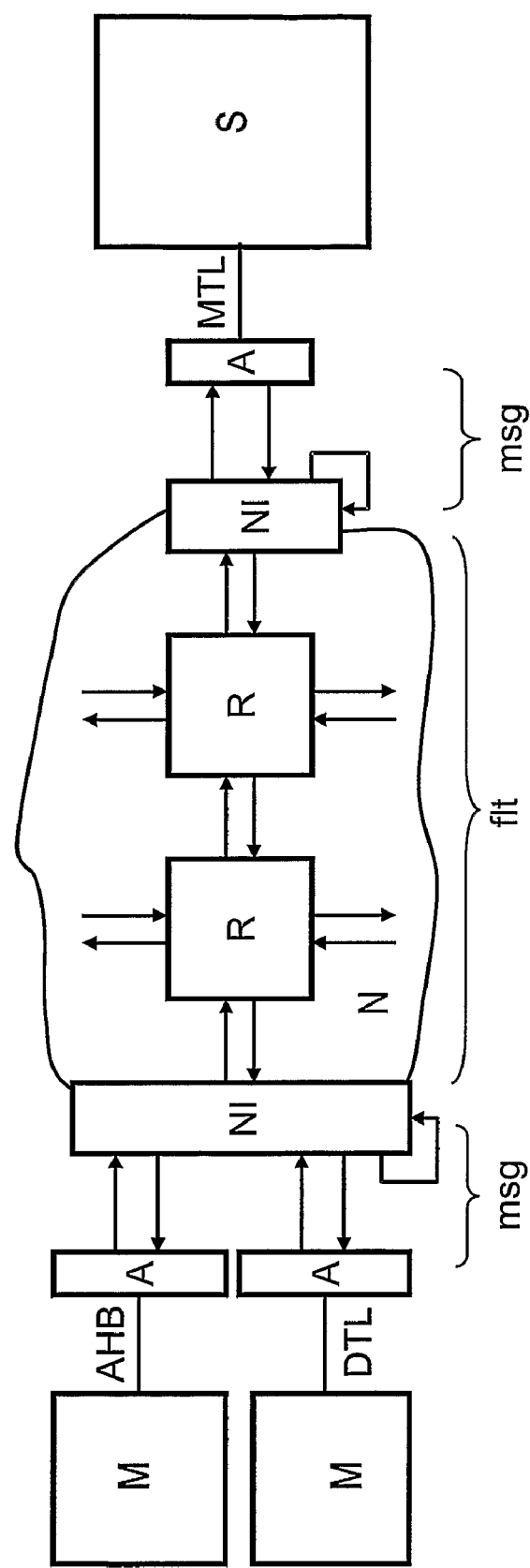
FIG. 1 shows a basic block diagram of a network on chip according to a first embodiment of the invention.

FIG. 1 shows a network on chip according to a first embodiment. In particular, two master modules M and a slave module S each with an associated network interface NI are depicted. Between network interfaces and its associated master M and slave S an adapter unit A is arranged, respectively, wherein the adapter units A may also be arranged in the network interface. Each module M, S is connected to a network N via its associated network interface NI, respectively, i.e. the network interfaces NI are used as interfaces between the master and slave modules M, S and the network N. The network interfaces NI are provided to manage the communication between the respective modules M, S and the network N, so that the modules can perform their dedicated operation without having to deal with the communication with the network or other modules. Here, the two masters are implemented as a CPU and an IP block and the slave is implemented as a memory.

The network N may be comprised of a plurality of interconnected network routers R. The routers R can be randomly connected amongst themselves (multiple links between routers are also possible) and to the network interfaces (i.e., there are no topology constraints). The routers R transport packets of data from one network interface NI to another. Such a packet consists of one or more flits, where a flit is the minimal transmission unit.

The modules as described the following can be so-called intellectual property blocks IPs (computation elements, memories or a subsystem which may internally contain interconnect modules) that interact with a network at said network interfaces NI. A network interface NI can be connected to one or more IP blocks. Similarly, an IP can be connected to more than one network interfaces.

The network on chip offers differentiated services based on connections. A connection describes a communication between one master and one or more slaves, with an associated service level, such as fifo transaction ordering, and maximum latency. Connections must be created stating the requested service level. The request for the connection are either accepted or rejected. Connection acceptance may lead to resource reservations in the network, e. g. buffers or a link bandwidth percentage. After usage, the connection is closed and these resources are freed. Different connections are created and closed independently, possibly at different points in time. The configurations thereof can be computed at compile time (i. e. off-line), or at run time.

A master module M requests a communication service, i.e. a request is issued to the slave module S. This request may comprise a command as well as some data. The slave S receives the request and performs the respective processings based on the received command and returns a response possibly also with some data. The adapter units A serve to connect the IP modules and their communication protocol to the network interface which in turn serve to connect to the network N. In other words, the adapter units A translate the requested communication service into messages msg, which are processed by the network interface NI and are translated into flits fit to be transmitted over the network N, in particular the adaptor unit A maps the identification means of these protocols to connections. The identification means in the existing protocols are: communication threads and addresses, i.e. the threads or addresses are mapped to connections through the interconnect based on specific connection properties.

Once a connection has been created, the master initiates transactions by means of requests which zero or more slaves execute, perhaps leading to a response. Examples of transactions are read, write, acknowledged write, test and set, and flush. By offering these transactions the transaction model is similar to existing bus protocols, to ease migration of IP from current interconnects to NOCs. However, to be able to take full advantage of increased NOC performance, transactions can also be pipelined, split, and posted.

The connections may comprise the following services, or connection properties: 1) data integrity, 2) transaction ordering, 3) transaction completion, 4) connection flow control, and 5) connection throughput, latency, and jitter. A connection can request any combination of these properties (e. g. a throughput guarantee, flow control, but no transaction ordering).

A connection may be based on a time-division multiplexed circuit-switching approach, where one or more circuits are set up for a connection. This requires a logical notion of synchronicity, where all routers and NIs are in the same slot. Circuits are created by reserving consecutive slots in consecutive routers/NIs. Accordingly, the circuits are pipelined, in the sense that if a circuit is set from router R to router R', and slot s is reserved at router R, then slot s+1 must be reserved at router R'. On these circuits, data received in one slot will be forwarded to the next router/NI in the next slot.

The network interfaces NI are responsible for packetization/depacketization, for implementing the connections and services, and for offering a standard interface (e.g., AXI or OCP) to the IP modules connected to the NoC. In particular, the network interfaces NI may implement adapter units A to existing on-chip protocols, such as AXI, OCP and DTL, to seamlessly connect existing IP modules to the NoC. These adapter units A may also be arranged between the IP blocks and their associated network interfaces.

Figure 2A:
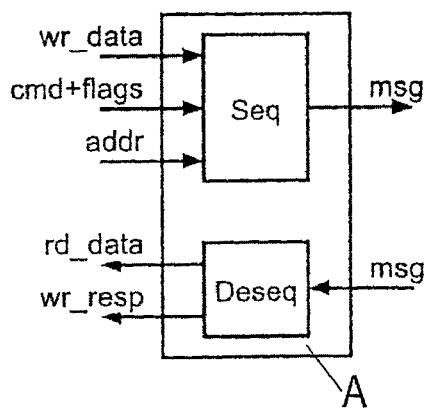
FIGS. 2A and 2B show a basic representation of a block diagram of an adapter of FIG. 1 associated to a master and a slave, respectively.
Figure 2B:
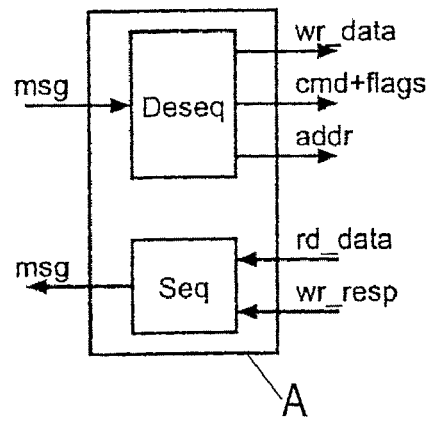

FIGS. 2A and 2B show a block diagram of the adapter units of FIG. 1 associated to a master M and a slave S, respectively. These adapter units A may also be considered as shells to map the communication services of an IP block to an network on chip environment by implementing (a simplified version of) a communication protocol such as AXI. Alternatively, (a simplified version of) any other communication protocol like OCP, DTL, or MTL may be implemented. The shells A comprise a sequentializing unit seq and a desequentializing unit deseq, respectively. The basic operation of such a shell associated to a master as shown in FIG. 2A is to sequentialize commands cmd and their flags flag, addresses adr, and write data wr_data in request messages msg, and to desequentialize messages msg into read data rd_data, and write responses wr_resp. The basic operation of a shell associated to a slave as shown in FIG. 2B is reversed to that of the shell according to FIG. 2B.

Figure 3:
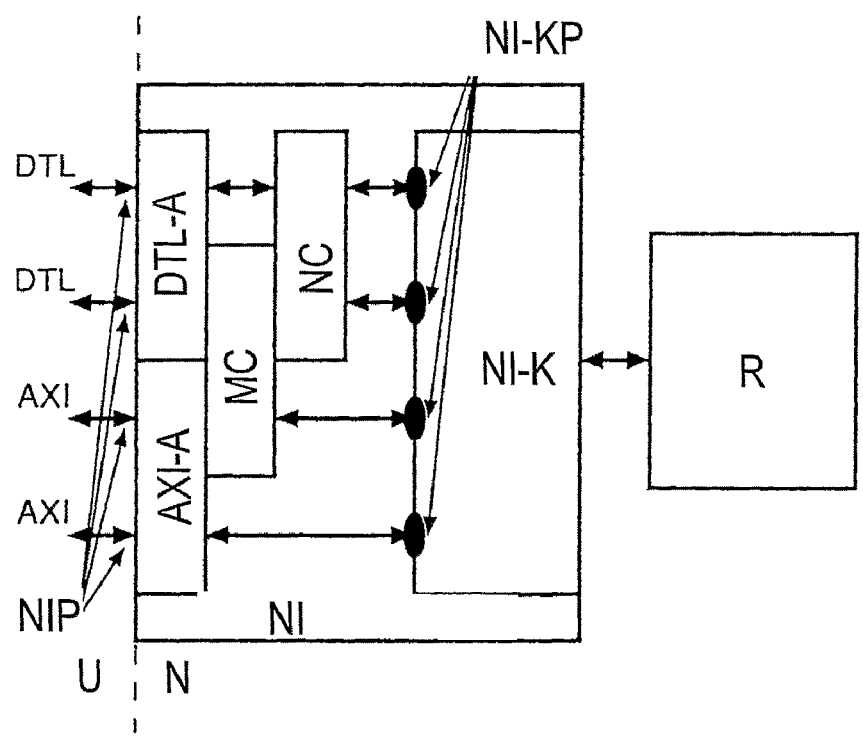
FIG. 3 shows a basic representation of a block diagram of a network interface of FIG. 1.

In FIG. 3 a block diagram of a network interface NI according to a second embodiment is shown. The network interface NI according to the second embodiment may be used in the network on chip of FIG. 1. In this embodiment the adapter units or the shells are implemented as part of the network interface NI. The network interface NI provides a conversion of the packet-based communication of the network N to the higher-level protocol (AHB, DTL, MTL) that the IP modules of FIG. 1 use.

In particular, the network interface comprises a network interface kernel NI-K, two adapter units AXI_A, DTL_A, a multicast unit MC and a narrowcast unit NC. The operation of the network interface is split into two parts, namely the network interface kernel NI_K, and the network interface shells or adapter units. The network interface kernel NI_K packetizes messages and schedules them to the routers, implements the end-to-end flow control, and the clock domain crossing. Moreover, the network interface shells or adapter units implement the connections (e.g., narrowcast, multicast), transaction ordering, and other higher-level issues specific to the protocol offered to the IP blocks. Therefore, the network interface NI comprise four network interface ports NIP, namely two DTL and two AXI ports. All ports NIP provide peer-to-peer connections to associated IP blocks based on a DTL and AXI communication protocol (not shown in FIG. 3).

With the NI kernel peer-to-peer connections (i.e., between on master and one slave) can be supported directly. These type of connections are useful in systems involving chains of modules communicating peer-to-peer with one another (e.g., video pixel processing).

To provide conversions to other protocols, the shells are provided around the NI kernel. Note that these shells add specific functionality, and can be plugged in or left out at design time according to the respective requirements.

In other words, the network on chip offers high-level services, such as transaction ordering, throughput and latency guarantees, and end-to-end flow control based on connections through the network. The throughput/latency guarantees are implemented using pipelined time-division-multiplexed circuit-switching. The network interfaces have a modular design, composed of kernel and shells. The NI kernel provides the basic functionality, including arbitration between connections, ordering, end-to-end flow control, packetization, and a link protocol with the router. Shells implement additional functionality, such as multicast and narrowcast connections, and adaptors to existing protocols, such as AXI or DTL. All these shells can be plugged in or left out at instantiation time according to the needs to optimize area cost.

In the following the operation of the adaptor units A, i.e. the shells, are described in more detail for IP block communication via communication threads. A communication thread can be directly mapped on a connection, i.e. one thread to one connection. Where communication threads are used to identify traffic classes of a communication based on specific communication parameters, such a thread and the associated traffic class can be mapped to a connection based on specific corresponding connection properties To exemplify the above, two communication threads identifying two traffic classes, namely one to a fast memory, and the other on a slow memory, may be considered. The thread identifying the fast traffic class can be mapped to a connection configured to guarantee high bandwidth, while the slow traffic class can be mapped to a connection with a low guaranteed bandwidth. Additionally, further properties can be specified, e.g., if a memory is present in the network on chip which is fast enough to consume any burst of incoming data, there may not be a necessity for end-to-end flow control for writes between the data producer and the memory. However, in a case for a slow memory in the network on chip, end-to-end flow control could be needed to prevent data loss caused by the slow consumption of data.

Moreover, multiple communication threads may alternatively be mapped to a single connection. This can be advantageous as resources can be utilized more efficiently by sharing them across multiple communication threads, and as related but different traffic is synchronized. Accordingly, communication on several communication threads can be associated a single set of properties. For example, when multiple data streams are sent to the same destination, and all require guaranteed throughput, they can be mapped to a single connection offering an aggregate guaranteed throughput.

Figure 4:
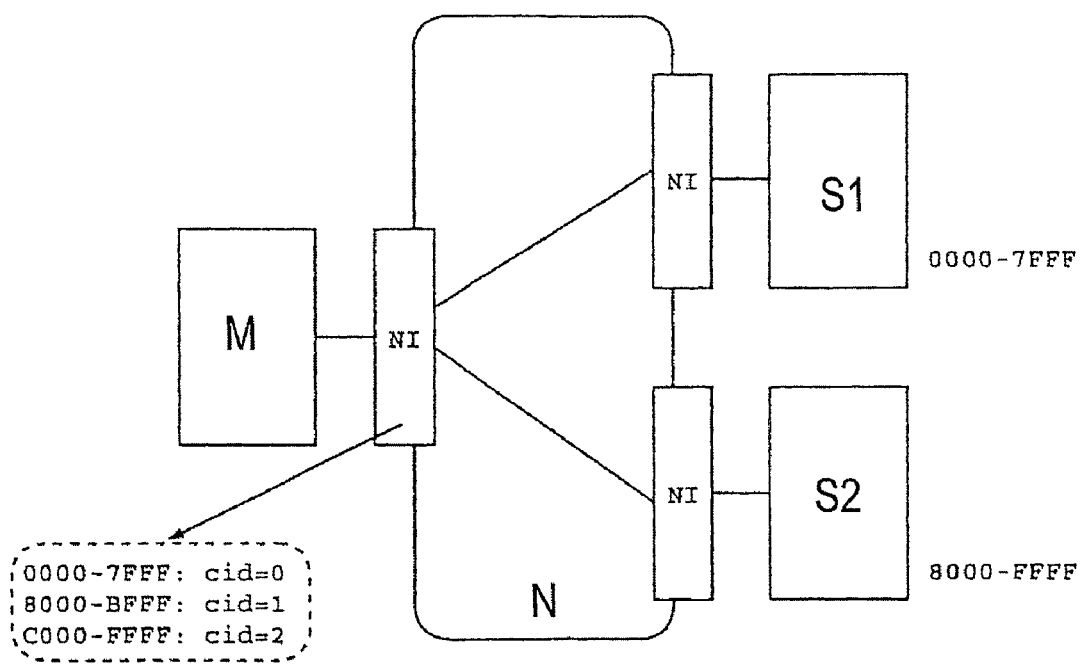
FIG. 4 shows a basic representation of a block diagram of a network on chip according to a further embodiment.

FIG. 4 shows a basic block diagram of a network on chip for illustrating the operation of the mapping of IP block communication via address ranges to connections. The network on chip comprises a master M and two slaves S1, S2 each being connected to a network via a network interface NI, respectively. The two slaves S1, S2 are implemented as memories, wherein the first slave S1 comprises the address range 0000-7FFF and the second slave S2 comprises the address range 8000-FFFF. Accordingly, the network interface NI associated to the master M may map the communication to the first slave S1, i.e. to the address range 0000-7FFF, to a connection with the connection id cid=0 and the communication to the second salve S2, i.e. to the address range 8000-FFFF, to a connection with the connection id cid=1.

Hence, protocols where there are no communication threads (e.g., DTL, MTL), address ranges can be mapped to specific connections. An address range can identify one or more slave modules, or a memory region within a slave module, e.g. a buffer used in some particular communication.

The above described mapping of address ranges to a connection can for example be applied to an Eclipse shell. Here, streams of data between modules are mapped on memory buffers. Producer and consumer modules read and write the streams via a shell using an identifier. The address generation and synchronization is performed in the shell. Each stream of data has a predefined buffer in the memory, and, hence, a predefined address range associated in the shell. Consequently, based on the addresses generated by the shell, a network interface can identify each stream, and map it to the right connection having connection properties.

Address to connection mapping is also possible in thread-based systems. Address ranges are mapped to connections, and thread identifiers are used for traffic ordering within connections.

The communication of the IP block described above may be implemented by existing protocols like, DTL Device Transaction Level (DTL) Protocol Specification, MTL Protocol Specification, AMBA AXI Protocol Specification, OCP International Partnership, Open Core Protocol Specification, or the like.

Summarizing it can be said, that the above described mapping is relevant for communication protocols which do not include the notion of connection, but are implemented with an interconnect supporting connections (e.g., AEthereal network on chip). The advantage is that it enables the use of connections for protocols without the notion of connection, allowing the configuration of differential services for different traffic classes. Backward compatibility of on-chip networks is achieved, by means of the adaptor units/shells to enable exiting protocols, such as DTL, AXI and OCP, to use differential services as offered by a connection based interconnect, such as an on-chip network.

Therefore, a system may be provided comprising a plurality of components communicating via a communication facility which at least comprises some identification means to identify the address of a destination and may additionally comprise thread information. In addition, the system comprises a mapping facility to map a range of addresses or a thread information to connection data. The connection data comprises specifications for data transport such as best effort or guaranteed throughput, the maximum allowed jitter, the maximum allowed latency, flow control Y/N, or ordering Y/N. If a message is sent to a particular address range in the system, or belongs to a particular thread, a connection is assigned to assure that the message is transmitted via a particular set of transmission requirements.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be construed as limiting the scope of the claims.

The invention claimed is:

1. Integrated circuit, comprising:
a plurality of processing modules (M, S), wherein at least one first of said processing modules (M) requests at least one communication service to at least one second processing module (S) based on specific communication properties and at least one communication service identification,
an interconnect means (N) for coupling said plurality of processing modules (M, S) and for enabling a connection based communication having a set of connection properties,
at least one network interface (NI) associated to said at least one first of said processing modules for controlling the communication between said at least one first of said plurality of processing modules (M) and said interconnect means (N), and
a mapping means (A) for mapping the requested at least one communication service based on said specific communication properties to a connection based on a set of connection properties according to said at least one communication service identification, wherein said at least one communication service identification comprises at least one communication thread or at least one address range, said address range for identifying one or more second processing modules (S) or a memory region within said one or more second processing modules (S).

2. Integrated circuit according to claim 1, wherein said mapping means (A) is arranged in said at least one network interface (NI).

3. Integrated circuit according to claim 1, wherein said at least one communication thread is mapped to at least one connection based on a set of connection properties.

4. Integrated circuit according to claim 3, wherein said communication service identification further comprises at least one address range in said at least one second processing module (S), wherein said at least one address range is mapped to at least one connection based on a set of connection properties.

5. Integrated circuit according to claim 1, wherein said at least one address range is mapped to at least one connection based on a set of connection properties.

6. Method of communication service mapping in an integrated circuit, having a plurality of processing modules (M, S), wherein at least one first of said processing modules (M) requests at least one communication service to at least one second processing module (S) based on specific communication properties and at least one communication service identification, wherein said at least one communication service identification comprises at least one communication thread or at least one address range, said address range for identifying one or more second processing modules (S) or a memory region within said one or more second processing modules (S), comprising the steps of:
coupling said plurality of processing modules (M, S) by an interconnect means (N) and
enabling a connection based communication having a set of connection properties,
controlling the communication between said at least one first of said plurality of processing modules (M) and said interconnect means (N) by at least one network interface (NI) associated to said at least one first of said processing modules,
mapping the requested at least one communication service based on said specific communication properties to a connection based on a set of connection properties according to said at least one communication service identification.

7. Data processing system, comprising
a plurality of processing modules (M, S), wherein at least one first of said processing modules (M) requests at least one communication service to at least one second processing module (S) based on specific communication properties and at least one communication service identification, wherein said at least one communication service identification comprises at least one communication thread or at least one address range, said address range for identifying one or more second processing modules (S) or a memory region within said one or more second processing modules (S),
an interconnect means (N) for coupling said plurality of processing modules (M, S) and for enabling a connection based communication having a set of connection properties,
at least one network interface (NI) associated to said at least one first of said processing modules for controlling the communication between said at least one first of said plurality of processing modules (M) and said interconnect means (N), and
a mapping means (A) for mapping the requested at least one communication service based on said specific communication properties to a connection based on a set of connection properties according to said at least one communication service identification.

* * * * *